(12) United States Patent
McEvoy

(10) Patent No.: US 10,139,113 B2
(45) Date of Patent: *Nov. 27, 2018

(54) TABLETOP COOKING ASSEMBLY

(71) Applicant: William B. McEvoy, Redford, MI (US)

(72) Inventor: William B. McEvoy, Redford, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/882,580

(22) Filed: Jan. 29, 2018

(65) Prior Publication Data

US 2018/0149368 A1 May 31, 2018

Related U.S. Application Data

(63) Continuation of application No. 14/076,782, filed on Nov. 11, 2013, now Pat. No. 9,897,328.
(Continued)

(51) Int. Cl.
*A47J 37/06* (2006.01)
*A47J 27/62* (2006.01)
(Continued)

(52) U.S. Cl.
CPC ....... *F24C 15/2035* (2013.01); *A47J 37/0676* (2013.01); *B01D 46/0032* (2013.01);
(Continued)

(58) Field of Classification Search
CPC .. F24C 15/2042; F24C 15/20; F24C 15/2021; F24C 15/322; F24C 15/325;
(Continued)

(56) References Cited

U.S. PATENT DOCUMENTS 60,453 A * 12/1866 Wilson ................... F23L 13/00
126/285 R
1,562,346 A 11/1925 Oster
(Continued)

FOREIGN PATENT DOCUMENTS

CN 201315818 Y 9/2009
WO 2010008279 A1 1/2010

OTHER PUBLICATIONS

NFPA, "NFPA 96, Standard for Ventilation Control and Fire Protection of Commercial Cooking Operations", 2001.
(Continued)

*Primary Examiner* — Eric Stapleton
(74) *Attorney, Agent, or Firm* — Howard & Howard Attorneys PLLC

(57) ABSTRACT

A tabletop cooking assembly for preparing foods thereon comprises a cooking element having a cooking area and a vent disposed peripherally to one side of the cooking element defining an aperture for receiving smoke from the cooking element. The assembly includes a first exhaust duct, a filter assembly, an electrostatic precipitator, and a high velocity blower. The first exhaust duct is substantially unobstructed and in fluid communication with the vent for directing smoke away from the cooking element. The high velocity blower is in fluid communication with the first exhaust duct and the filter assembly for drawing smoke from the cooking element through the vent. The heating system includes a retaining plate, a plurality of heating strips, and an insulating material. The heating strips are disposed between the retaining plate and the heating surface to heat the cooking area for preparing foods thereon.

20 Claims, 14 Drawing Sheets

Related U.S. Application Data

(60) Provisional application No. 61/818,655, filed on May 2, 2013.

(51) Int. Cl.
  *F24C 15/20* (2006.01)
  *B01D 46/00* (2006.01)
  *B01D 46/42* (2006.01)
  *B01D 46/44* (2006.01)
  *B01D 46/46* (2006.01)

(52) U.S. Cl.
  CPC ..... *B01D 46/0095* (2013.01); *B01D 46/4236* (2013.01); *B01D 46/446* (2013.01); *B01D 46/46* (2013.01); *F24C 15/2042* (2013.01)

(58) Field of Classification Search
  CPC .............. F24C 15/2035; A47J 37/0676; B01D 46/0032; B01D 46/0095; B01D 46/4236; B01D 46/446; B01D 46/46
  USPC ......... 99/331, 339, 357, 416, 422, 447–450, 99/482; 219/448.11, 450.1, 452.11, 725, 219/733–735, 756–757; 126/21 R, 21 A, 126/84, 80, 299 R, 299 D, 299 E, 299 F, 126/312, 278–279
  See application file for complete search history.

(56) References Cited

U.S. PATENT DOCUMENTS

| | | | | |
|---|---|---|---|---|
| 1,582,346 A * | 4/1926 | Oster | ...................... | F24C 1/16 108/29 |
| 2,577,150 A * | 12/1951 | Pledger | .................... | F24C 15/20 126/299 R |
| 2,868,108 A * | 1/1959 | Petersen | ................. | F24C 15/20 126/299 D |
| 3,212,873 A * | 10/1965 | Richter | ................. | C07C 233/00 504/335 |
| 3,242,652 A * | 3/1966 | Malenchini | ............ | F24C 15/20 169/19 |
| 3,299,620 A * | 1/1967 | Hollingworth | ........ | B01D 47/06 261/142 |
| 3,412,530 A * | 11/1968 | Cardiff | ..................... | B03C 3/32 126/299 D |
| 3,491,744 A * | 1/1970 | von Kohorn, Jr. | .... | A47B 31/02 126/25 R |
| 3,494,108 A * | 2/1970 | Moragne | ................. | F24C 15/20 126/299 E |
| 3,500,740 A * | 3/1970 | Aubrey | ................... | F24C 15/20 126/299 D |
| 3,513,766 A * | 5/1970 | Ahlrich | ................... | F24C 15/20 126/299 D |
| 3,570,040 A * | 3/1971 | Wada | ...................... | A47L 11/20 15/340.2 |
| 3,590,804 A * | 7/1971 | Welshofer | ............. | F24C 14/025 126/11 |
| 3,596,439 A * | 8/1971 | Moragne | ................. | B01D 50/00 126/299 E |
| 3,664,255 A * | 5/1972 | Kuechler | ................. | F24C 15/20 126/299 D |
| 3,785,124 A * | 1/1974 | Gaylord | ............. | F24C 15/2057 126/299 D |
| 3,854,388 A * | 12/1974 | King | ...................... | B01D 50/00 126/299 E |
| 3,891,548 A * | 6/1975 | Marcussen | ............. | B01D 35/22 210/167.01 |
| 3,952,640 A * | 4/1976 | Kuechler | ................. | F24C 15/20 126/299 D |
| 4,070,670 A * | 1/1978 | Chen | ....................... | F24C 3/126 126/42 |
| 4,089,327 A * | 5/1978 | Welsh | ................... | F24C 15/20 126/299 D |
| RE29,837 E * | 11/1978 | Moore | ................. | H05B 6/6408 219/710 |
| 4,153,044 A * | 5/1979 | Nett | ........................ | F24C 15/20 126/299 D |
| 4,201,186 A * | 5/1980 | Paquin | .................... | F24B 1/022 110/267 |
| 4,250,870 A * | 2/1981 | Kuechler | ................. | F24C 15/20 126/299 D |
| 4,251,025 A * | 2/1981 | Bonne | ..................... | F23N 1/065 236/14 |
| 4,284,421 A * | 8/1981 | Howard | ................ | B01D 45/10 126/299 E |
| 4,286,572 A * | 9/1981 | Searcy | .................... | F24C 15/20 126/299 D |
| 4,346,692 A * | 8/1982 | McCauley | ............ | F24F 13/075 126/299 D |
| 4,350,504 A * | 9/1982 | Diachuk | ................. | B01D 50/002 126/299 C |
| 4,366,525 A * | 12/1982 | Baumgartner | .......... | H01T 23/00 361/231 |
| 4,473,382 A * | 9/1984 | Cheslock | ................ | B03C 3/155 361/231 |
| 4,506,655 A * | 3/1985 | Kuechler | ................. | F24C 15/20 126/299 D |
| 4,562,827 A * | 1/1986 | Cerola | ................ | F24C 15/2042 126/299 R |
| 4,655,194 A * | 4/1987 | Wooden | ................. | F24C 15/20 126/299 D |
| 4,854,949 A * | 8/1989 | Giles, Sr. | ................ | B03C 3/155 96/58 |
| 4,884,949 A * | 12/1989 | Eakin | ...................... | F02B 61/04 403/287 |
| 4,902,316 A * | 2/1990 | Giles, Sr. | ................. | A21B 1/48 96/58 |
| 4,934,337 A * | 6/1990 | Falk | ................... | F24C 15/2042 126/299 R |
| 4,941,400 A * | 7/1990 | Moore | .................... | A47J 27/0817 126/299 R |
| 4,962,694 A * | 10/1990 | Graver | .................... | A47J 36/38 126/21 A |
| 5,002,040 A * | 3/1991 | MacFarlane | ........ | F24C 15/2021 126/299 D |
| 5,063,906 A * | 11/1991 | Rogers | .................... | B03C 3/017 126/299 D |
| 5,069,197 A * | 12/1991 | Wisting | ............. | F24C 15/2057 126/299 D |
| 5,154,161 A * | 10/1992 | Rogers | .................... | B03C 3/017 126/299 D |
| 5,205,279 A * | 4/1993 | Brown | ................ | F24C 15/2042 126/299 D |
| 5,211,159 A * | 5/1993 | Lieblein | ................. | B03C 3/017 126/299 D |
| 5,215,557 A * | 6/1993 | Johnson | .................. | B01D 47/06 55/341.1 |
| 5,235,150 A * | 8/1993 | Buske | .................... | A47J 37/015 219/722 |
| 5,251,608 A * | 10/1993 | Cote | .................... | F24C 15/2028 126/299 D |
| 5,287,799 A * | 2/1994 | Pickering | ............ | F24C 15/2042 126/1 R |
| 5,325,842 A * | 7/1994 | Beach | ..................... | F24C 3/126 126/21 R |
| 5,419,239 A * | 5/1995 | Covington | ............... | A47J 36/38 126/21 A |
| 5,467,761 A * | 11/1995 | Kuechler | ................. | F24C 15/20 126/299 D |
| 5,577,490 A * | 11/1996 | Overton, Jr. | ......... | F24C 15/2042 126/299 D |
| 5,704,955 A * | 1/1998 | Giles | ................. | B01D 46/0005 55/422 |
| 5,925,172 A * | 7/1999 | Rick | ...................... | B01D 46/10 96/397 |
| 5,941,235 A * | 8/1999 | Carter | .................... | F24C 15/20 126/299 D |
| 5,993,195 A * | 11/1999 | Thompson | .............. | F23N 1/067 126/116 A |

(56) References Cited

U.S. PATENT DOCUMENTS

| | | | | |
|---|---|---|---|---|
| 6,036,736 A * | 3/2000 | Wallace | ............... | F24C 15/20 55/385.1 |
| 6,041,772 A * | 3/2000 | Ward | ............... | F24C 15/20 126/299 D |
| 6,041,774 A * | 3/2000 | Ward | ............... | F24C 15/20 126/299 D |
| 6,050,258 A * | 4/2000 | Neitzel | ............... | F04D 29/023 126/299 D |
| 6,142,142 A * | 11/2000 | Woodall, III | ............... | F04D 27/004 126/299 R |
| 6,182,653 B1 * | 2/2001 | Otenbaker | ............... | F24C 15/20 126/299 D |
| 6,241,809 B1 * | 6/2001 | Hopkins | ............... | B01D 45/06 55/DIG. 36 |
| 6,344,074 B1 * | 2/2002 | Ward | ............... | B01D 46/0036 126/299 D |
| 6,716,274 B2 * | 4/2004 | Gogins | ............... | B01D 39/1623 95/273 |
| 6,772,753 B2 | 8/2004 | Roesler et al. | | |
| 6,776,152 B2 * | 8/2004 | Lee | ............... | F24C 15/2035 126/299 D |
| 6,837,152 B1 * | 1/2005 | Chiang | ............... | A47J 36/38 126/299 E |
| 6,849,100 B2 * | 2/2005 | Lim | ............... | F24F 3/161 55/385.2 |
| 6,962,621 B2 * | 11/2005 | Jung | ............... | B01D 46/02 55/318 |
| 7,002,110 B2 * | 2/2006 | Satou | ............... | F24C 15/2042 126/299 D |
| 7,018,449 B2 * | 3/2006 | Fitch | ............... | B01D 39/04 55/385.1 |
| 7,041,159 B2 * | 5/2006 | Entezarian | ............... | B01D 50/002 55/320 |
| 7,077,893 B2 * | 7/2006 | Guilliard | ............... | B01D 46/0004 454/184 |
| 7,089,763 B2 * | 8/2006 | Forsberg | ............... | E03B 3/28 62/635 |
| 7,132,000 B2 * | 11/2006 | Muerner | ............... | A61K 8/33 8/405 |
| 7,132,009 B2 * | 11/2006 | Chiang | ............... | B03C 3/014 96/50 |
| 7,373,787 B2 * | 5/2008 | Forsberg | ............... | E03B 3/28 62/285 |
| 7,677,962 B2 * | 3/2010 | Chang | ............... | H05K 7/20181 353/57 |
| 7,687,740 B2 * | 3/2010 | Bruland | ............... | B23K 26/0613 219/121.67 |
| 7,687,748 B2 * | 3/2010 | Gagas | ............... | H05B 6/1263 126/21 A |
| 7,695,049 B2 * | 4/2010 | Colborne | ............... | B60P 3/14 135/88.13 |
| 7,699,051 B2 * | 4/2010 | Gagas | ............... | F24C 15/2028 126/299 D |
| 7,717,107 B2 * | 5/2010 | Ota | ............... | F24C 15/2042 108/50.13 |
| 7,720,235 B2 * | 5/2010 | Abe | ............... | G10L 19/02 381/94.3 |
| 7,726,235 B1 * | 6/2010 | Frantz | ............... | A47J 37/0676 126/39 BA |
| 8,191,464 B2 * | 6/2012 | Fraij | ............... | A47J 37/1266 99/331 |
| 8,273,162 B2 * | 9/2012 | Pagano | ............... | B01D 53/0407 4/218 |
| 8,312,873 B2 * | 11/2012 | Gagas | ............... | F24C 15/2035 126/299 D |
| 8,404,023 B1 * | 3/2013 | Osborne | ............... | B01D 53/0407 95/148 |
| 8,669,499 B2 * | 3/2014 | Conrad | ............... | A47J 37/067 126/211 |
| 8,728,189 B2 * | 5/2014 | Prasser | ............... | B01D 45/08 165/158 |
| 8,852,307 B2 * | 10/2014 | Sikkenga | ............... | B01D 45/08 55/434.2 |
| 9,897,328 B2 * | 2/2018 | McEvoy | ............... | A47J 37/0676 |
| 2003/0051606 A1 * | 3/2003 | Cusenza | ............... | A47J 27/16 99/357 |
| 2003/0146082 A1 * | 8/2003 | Gibson | ............... | A61L 9/015 204/157.3 |
| 2003/0231780 A1 * | 12/2003 | Enamito | ............... | G10K 11/178 381/94.1 |
| 2004/0020485 A1 * | 2/2004 | Roesler | ............... | F24C 15/001 126/80 |
| 2004/0035411 A1 * | 2/2004 | Livchak | ............... | F15D 1/02 126/299 R |
| 2005/0167415 A1 * | 8/2005 | Satou | ............... | F24C 15/2042 219/450.1 |
| 2005/0186108 A1 * | 8/2005 | Fields | ............... | A61L 2/10 422/4 |
| 2005/0224069 A1 * | 10/2005 | Patil | ............... | F24C 15/2021 126/299 D |
| 2006/0032492 A1 * | 2/2006 | Bagwell | ............... | F15D 1/02 126/299 R |
| 2006/0055193 A1 * | 3/2006 | Colborne | ............... | B60P 3/14 296/24.3 |
| 2006/0278215 A1 * | 12/2006 | Gagas | ............... | F24C 15/2042 126/299 D |
| 2006/0278216 A1 * | 12/2006 | Gagas | ............... | F24C 15/2028 126/299 D |
| 2007/0023420 A1 * | 2/2007 | Gagas | ............... | H05B 6/1263 219/623 |
| 2007/0039345 A1 * | 2/2007 | Forsberg | ............... | E03B 3/28 62/285 |
| 2007/0062513 A1 * | 3/2007 | Gagas | ............... | F24C 15/2021 126/299 D |
| 2008/0029081 A1 * | 2/2008 | Gagas | ............... | F24C 15/2035 126/299 D |
| 2008/0121224 A1 * | 5/2008 | Giles | ............... | F24C 15/2035 126/299 R |
| 2008/0216668 A1 * | 9/2008 | Fraij | ............... | A47J 37/1266 99/331 |
| 2009/0032011 A1 * | 2/2009 | Livchak | ............... | F24C 15/20 126/299 D |
| 2009/0264060 A1 * | 10/2009 | Livchak | ............... | B08B 15/023 454/61 |
| 2010/0163549 A1 * | 7/2010 | Gagas | ............... | H05B 6/1209 219/622 |
| 2011/0030560 A1 * | 2/2011 | Bohlen | ............... | A61L 9/015 96/57 |
| 2011/0033346 A1 * | 2/2011 | Bohlen | ............... | A61L 9/205 422/186.3 |
| 2012/0008100 A1 * | 1/2012 | Tani | ............... | G02F 1/133385 353/58 |
| 2012/0083198 A1 * | 4/2012 | Sinur | ............... | F24C 15/20 454/237 |
| 2012/0118150 A1 * | 5/2012 | Brizes | ............... | A61L 9/16 95/69 |
| 2012/0174801 A1 * | 7/2012 | Chiang | ............... | A47J 37/0781 99/357 |
| 2012/0204855 A1 * | 8/2012 | Huber | ............... | F24C 15/2035 126/299 R |
| 2012/0247345 A1 * | 10/2012 | Chiang | ............... | F24C 15/2035 99/357 |
| 2012/0247451 A1 * | 10/2012 | Chiang | ............... | F24C 15/2042 126/299 D |
| 2013/0008317 A1 * | 1/2013 | Conrad | ............... | A47J 37/067 99/339 |
| 2013/0042853 A1 * | 2/2013 | Chiang | ............... | F24C 15/2042 126/299 D |
| 2013/0047857 A1 * | 2/2013 | Bohlen | ............... | B03C 3/68 96/18 |
| 2013/0047858 A1 * | 2/2013 | Bohlen | ............... | B03C 3/47 96/75 |
| 2013/0047859 A1 * | 2/2013 | Bohlen | ............... | B03C 3/47 96/80 |

(56) References Cited

U.S. PATENT DOCUMENTS

2013/0052090 A1* 2/2013 Bohlen .................. A61L 9/205
  422/121
2013/0333686 A1* 12/2013 Chiang ............... F24C 15/2021
  126/299 D
2014/0326145 A1* 11/2014 McEvoy ............. A47J 37/0676
  99/331

OTHER PUBLICATIONS

Youth Worker Safety in Restaurants eTool Cooking—Heat Hazards, accessed Apr. 4, 2016.

* cited by examiner

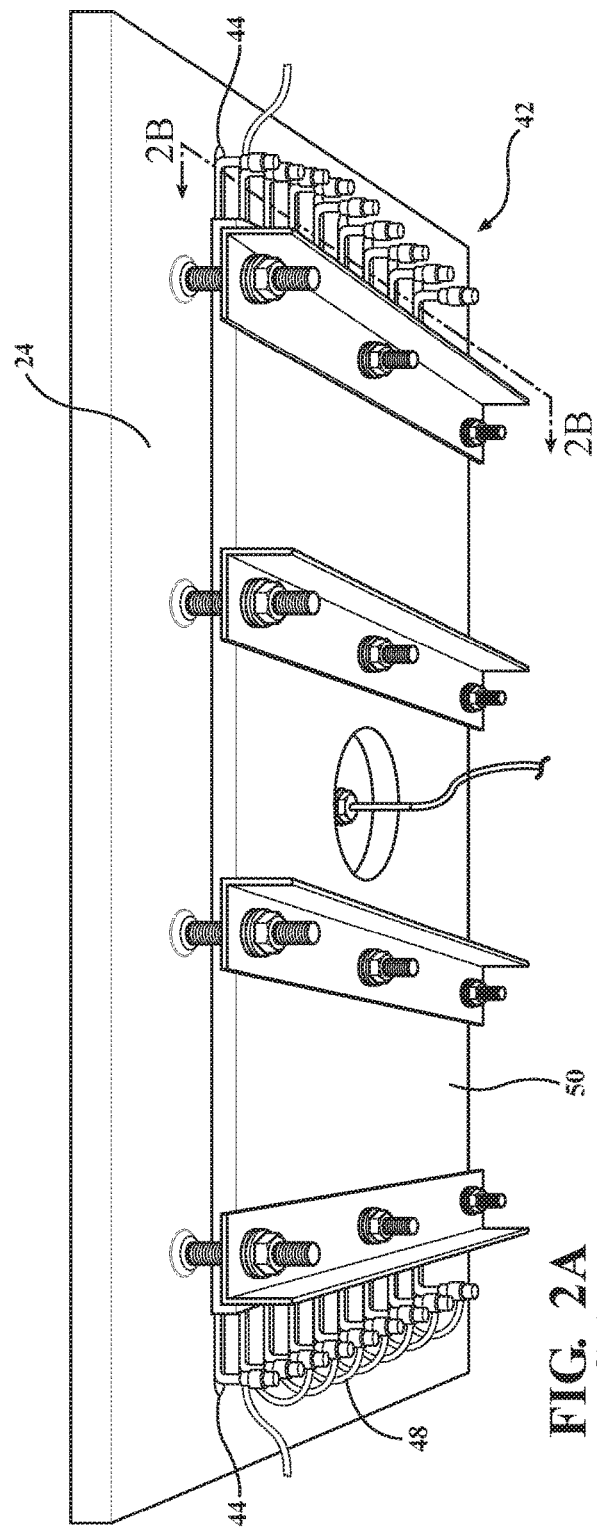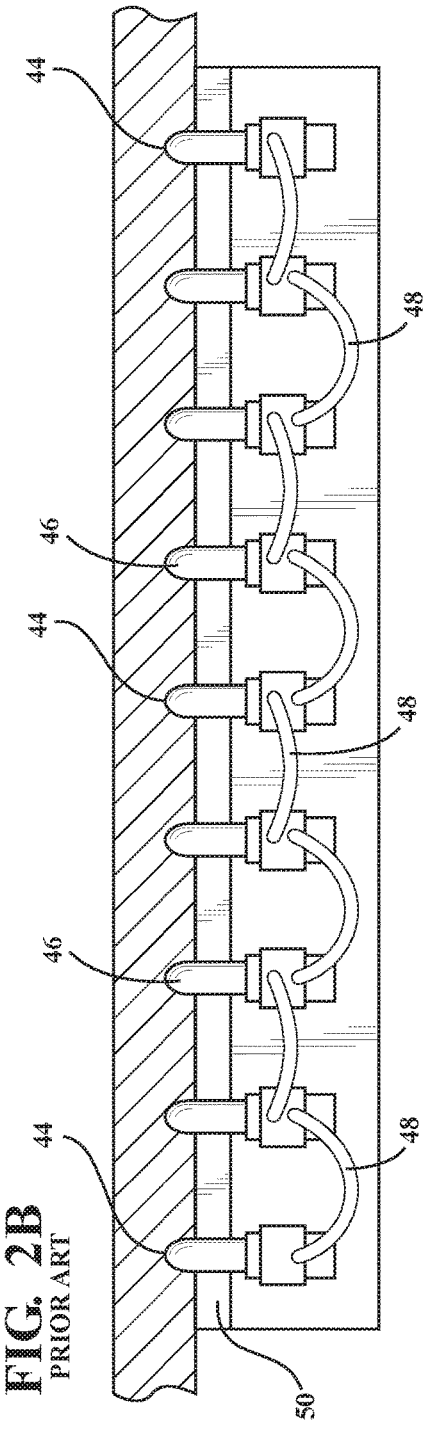
FIG. 2A
PRIOR ART
FIG. 2B
PRIOR ART

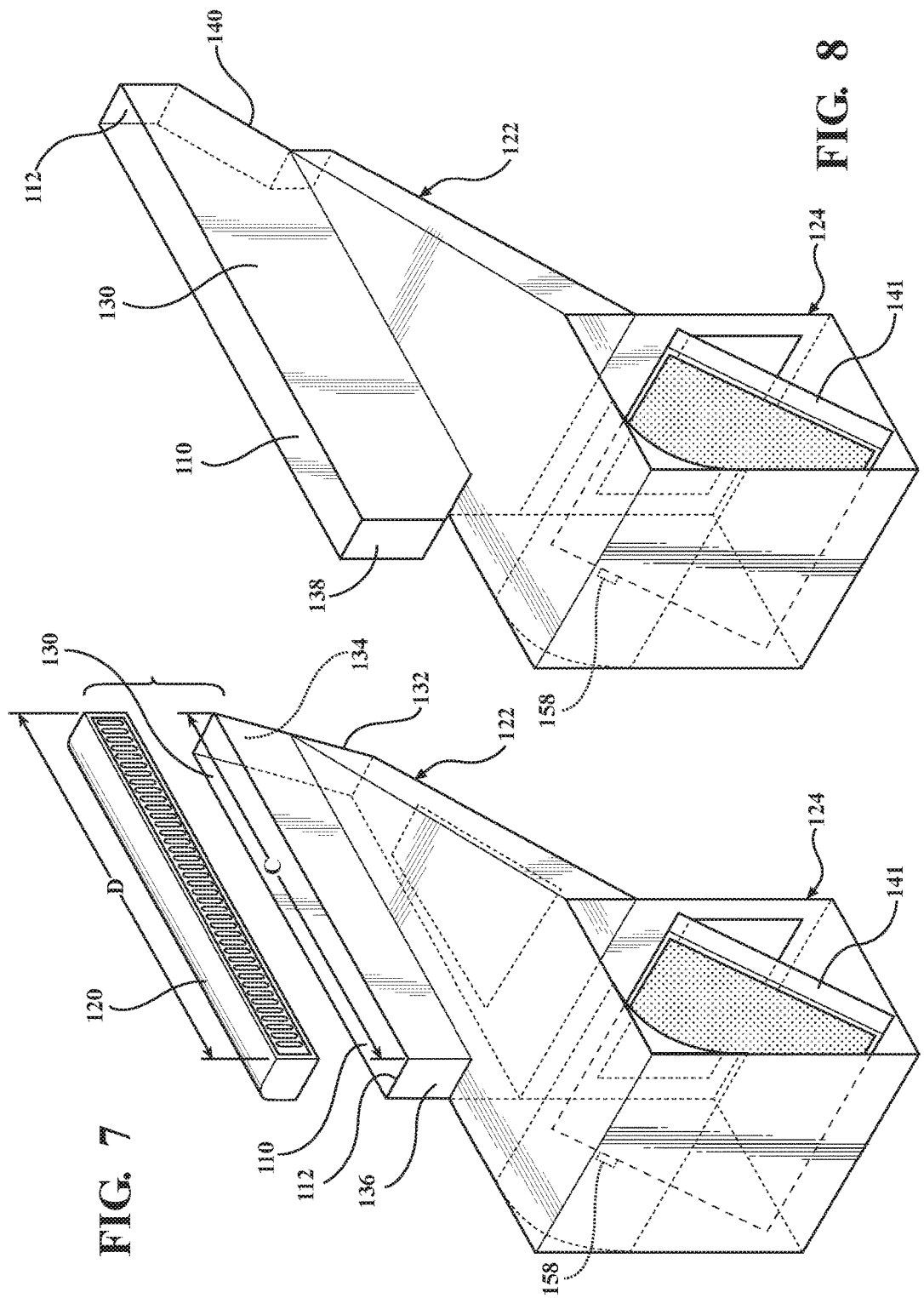

TABLETOP COOKING ASSEMBLY

CROSS REFERENCE TO RELATED APPLICATION

This application is a continuation application of U.S. application Ser. No. 14/076,782 filed Nov. 11, 2013, which claims the benefit of U.S. Provisional Patent Application Ser. No. 61/818,655 filed May 2, 2013.

BACKGROUND OF THE INVENTION

1. Field of the Invention

The present invention relates to a tabletop cooking assembly, particularly to a teppanyaki assembly that has increased cooking efficiently, increased collection of smoke and oil from a cooking surface during operation, and increased safety features.

2. Description of the Related Art

A typical teppanyaki assembly 20, shown in FIG. 1, includes a table frame 22 having a cooking element 24 disposed thereon, a vent 26 defining an aperture 28 and a vent hood 30 disposed adjacent the aperture 28. An exhaust duct 32 is connected to the aperture 28 for directing smoke away from the cooking element 24. The assembly also includes a filter 34 in fluid communication with the vent 26 and in the path of the air flow of the exhaust duct 32 and an electrostatic precipitator 36.

When the cooking element 24 generates smoke, including oil fumes and odorous air while cooking, the smoke passes through the vent hood 30 and the aperture 28 and into the exhaust duct 32. The smoke is filtered by the filter 34 and further cleaned by the electrostatic precipitator 36. Generally, the filter 34 needs to be cleaned often for keeping the air circulation at a desired rate. A blower 38 is downstream and separate from the electrostatic precipitator 36. The electrostatic precipitator 36 and the blower 38 are individual and separate units connected together by a duct. One drawback to such a configuration is that the assembly has inefficiencies that lead to insufficient capture of the smoke generated on the cooking surface.

One such teppanyaki assembly is shown in United States Patent Application Publication 2012/0247345 to Chiang having the exhaust duct 32 diverted around a control panel 40, which reduces the amount of air flow and less smoke is captured from the cooking element 24. Another draw back is that if a fire were to erupt in the exhaust duct 32 adjacent to the control panel 40, a tremendous amount of heat would be generated and result in the control panel 40 being melted, burned, or shorted out, such that any safety mechanisms could not be activated.

Various heating mechanisms 42 are known for use with teppanyaki assemblies. One such heating mechanism 42 is shown in FIGS. 2A and 2B. The underside of the cooking element 24 has a plurality of channels 44 milled into the underside of the cooking element 24. Each of the channels 44 is tubular, or round, and receives a tubular or round heating strip 46. Each of the heating strips 46 are separate from one another, as best shown in FIG. 2, but each of the heating strips 46 are connected together with an exposed connection 48. These exposed connections 48 generate heat which can result in injury when the teppanyaki assemblies are utilized. The heating mechanism 42 also includes a retaining plate 50, formed of metal, directly adjacent to the heating strips 46. Because the heating strips 46 are tubular and the channels 44 are tubular, the heat transfer from the heating strips 46 to the cooking element 24 is inefficient because there is a small contact area and the heat is transferred from the heating strips 46 to the retaining plate 50. During operation, the retaining plate 50 absorbs the heat from the heating strips 46 and becomes very hot, which exposes users to potential injury. Further, the combination of the exposed connections 48 being in series with one another and the tubular channels 44 requires the entire heating mechanism 42 to be removed to service any of the heating strips 46.

Accordingly, it would be advantageous to provide a teppanyaki assembly that overcomes these inadequacies.

SUMMARY OF THE INVENTION AND ADVANTAGES

The subject invention discloses tabletop cooking assembly for preparing foods thereon. The assembly comprises a table frame supporting a cooking element for receiving items to be cooked. A vent is disposed peripherally to one side of the cooking element and defines an aperture for receiving smoke generated during the preparation of food on the cooking element and a vent hood is disposed adjacent to the vent. A first exhaust duct is in fluid communication with the vent for directing smoke away from the cooking element. The first exhaust duct comprises an upper plenum and a lower plenum that is substantially perpendicular to the upper plenum. The first exhaust duct is substantially unobstructed to achieve improved air flow and smoke collection. A filter assembly is in fluid communication with the lower plenum and comprises a filter disposed therein for filtering the smoke as the smoke passes through the filter assembly. A high velocity blower in fluid communication with the first exhaust duct and the filter assembly draws smoke from the cooking element through the vent at a velocity greater than 750 feet per minute to substantially cool the smoke for improving removal of particles from the smoke as a result of the first exhaust duct being substantially unobstructed.

The subject invention also discloses a heating system for coupling to a heating surface of the cooking element. A release mechanism releasably secures the heating system into engagement with the heating surface and allows the heating system to be loosened from the heating surface without being completely removed therefrom. The heating system includes a retaining plate, a plurality of heating strips, and an insulating material disposed between the retaining plate and the heating strips for directing heat from the strips toward the heating surface. The heating strips are disposed between the retaining plate and the heating surface to heat the cooking area for preparing foods thereon. Each of the plurality of heating elements are separately removable from one another from the heating system for allowing efficient replacement thereof.

The subject invention provides numerous advantages over the related art assemblies. First, the subject invention ensures complete, or nearly complete, capture of smoked generated on the cooking surface while cooking because the first exhaust duct is not substantially obstructed. Second, the subject invention has better temperature control and energy efficiency because the heating mechanism is insulated and has a larger contact area between the heating elements and the cooking surface.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2A is a perspective view of an underside of a related art cooking surface for cooking assembly and FIG. 2B is a cross-sectional view of the heating mechanism having channels milled therein to receive heating elements;

FIG. 7 is a perspective view of one embodiment of a first exhaust duct and a filter assembly according to the subject invention;

FIG. 8 is a perspective view of another embodiment of a first exhaust duct and a filter assembly according to the subject invention;

DETAILED DESCRIPTION OF THE INVENTION

Figure 3:
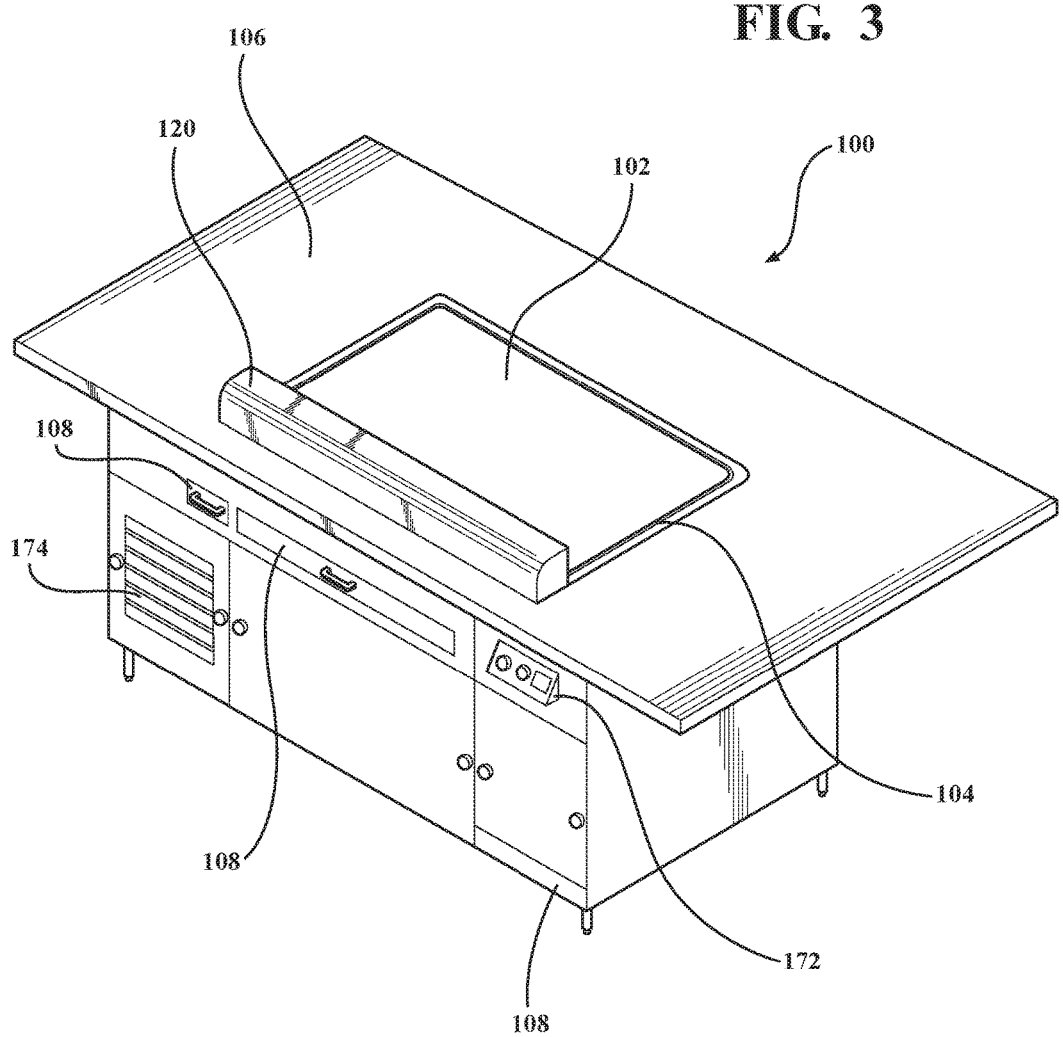
FIG. 3 is a perspective view of one embodiment of a tabletop cooking assembly formed according to the subject invention.

Referring to the Figures, wherein like numerals indicate like or corresponding parts throughout the several views, a tabletop cooking assembly for preparing foods thereon is shown from a food preparation side generally at 100 in FIG. 3. The food preparation side is to be understood as the side where a chef may be located while preparing food on the assembly 100. The side opposite the preparation side is to be understood as the customer side. The assembly 100 generally comprises a cooking element 102 having a cooking area 104 on a topside for receiving items to be cooked and a serving area 106 adjacent the cooking area 104. The serving area 106 may be configured to seat numerous diners and may be various different shapes, such as square, rectangle, semi-circular, or the like. Similarly, the cooking element 102 may be various shapes depending on the particular configuration.

The cooking element 102 may be square, rectangular, semi-circular or the like without deviating from the subject invention. However, it is preferred that the cooking element 102 is rectangular in shape and the surrounding serving area 106 is unheated.

Figure 4:
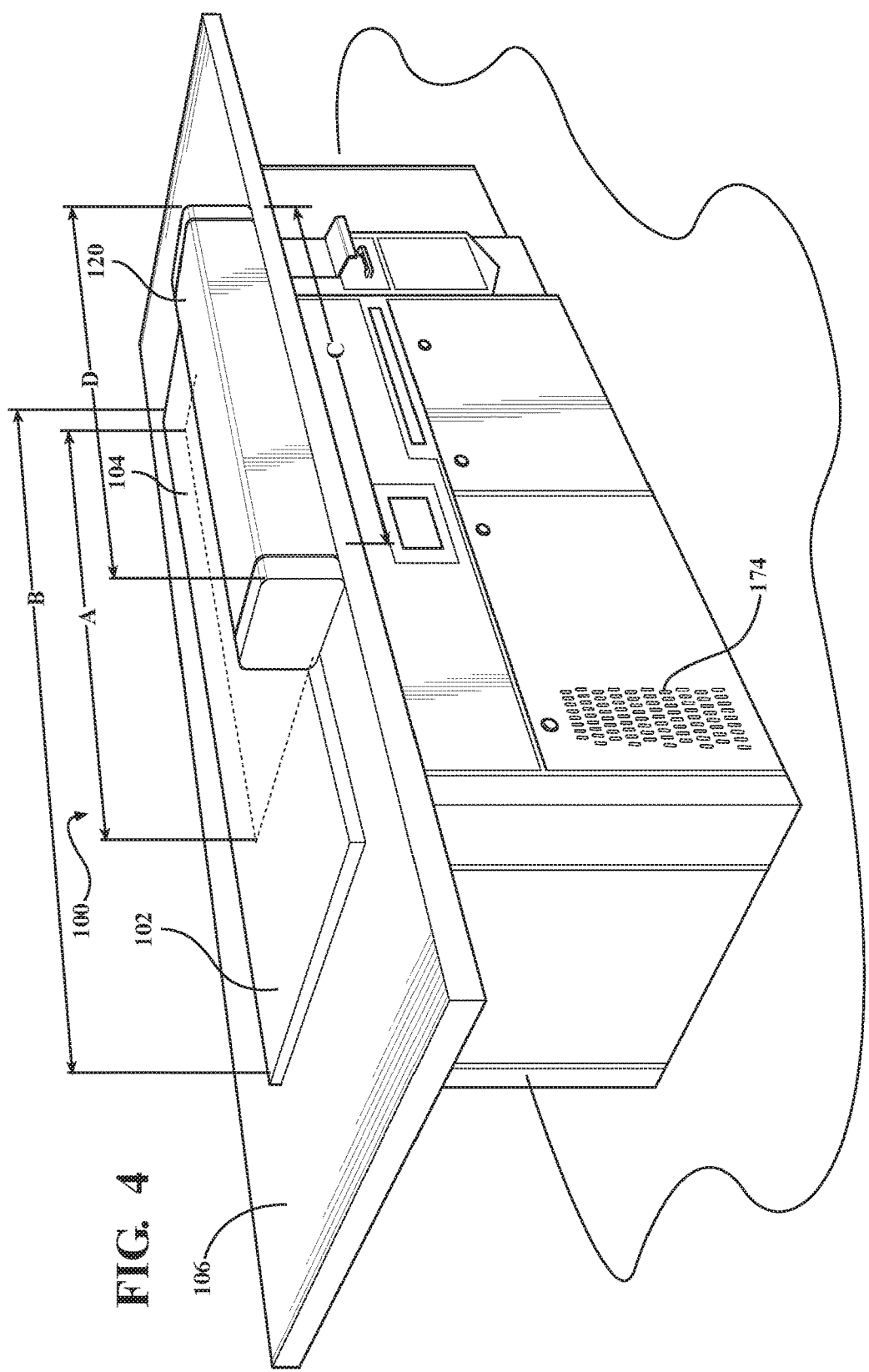
FIG. 4 is a perspective view of another embodiment of a tabletop cooking assembly formed according to the subject invention.

The assembly 100 may include grease drawers 108 as is customary for cleaning the assembly 100. A vent 110 is disposed peripherally to one side of the cooking element 102 and defines an aperture 112 for receiving smoke generated during the preparation of food on the cooking element 102. FIG. 4 is an alternative embodiment of the tabletop cooking assembly 100.

Figure 5:
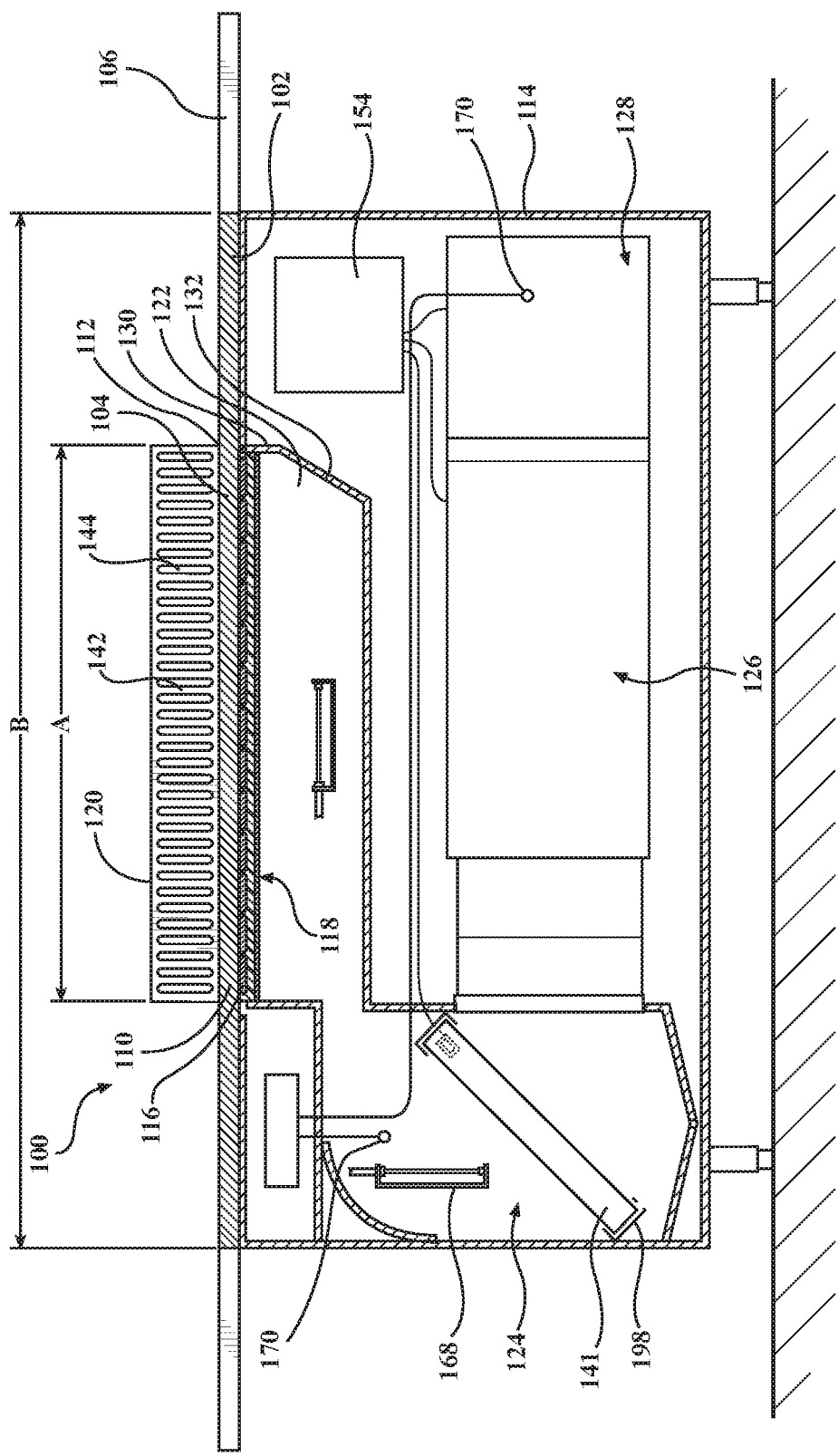
FIG. 5 is a cross-sectional view of the embodiment of the tabletop cooking assembly shown in FIG. 4 from a customer side.
Figure 6:
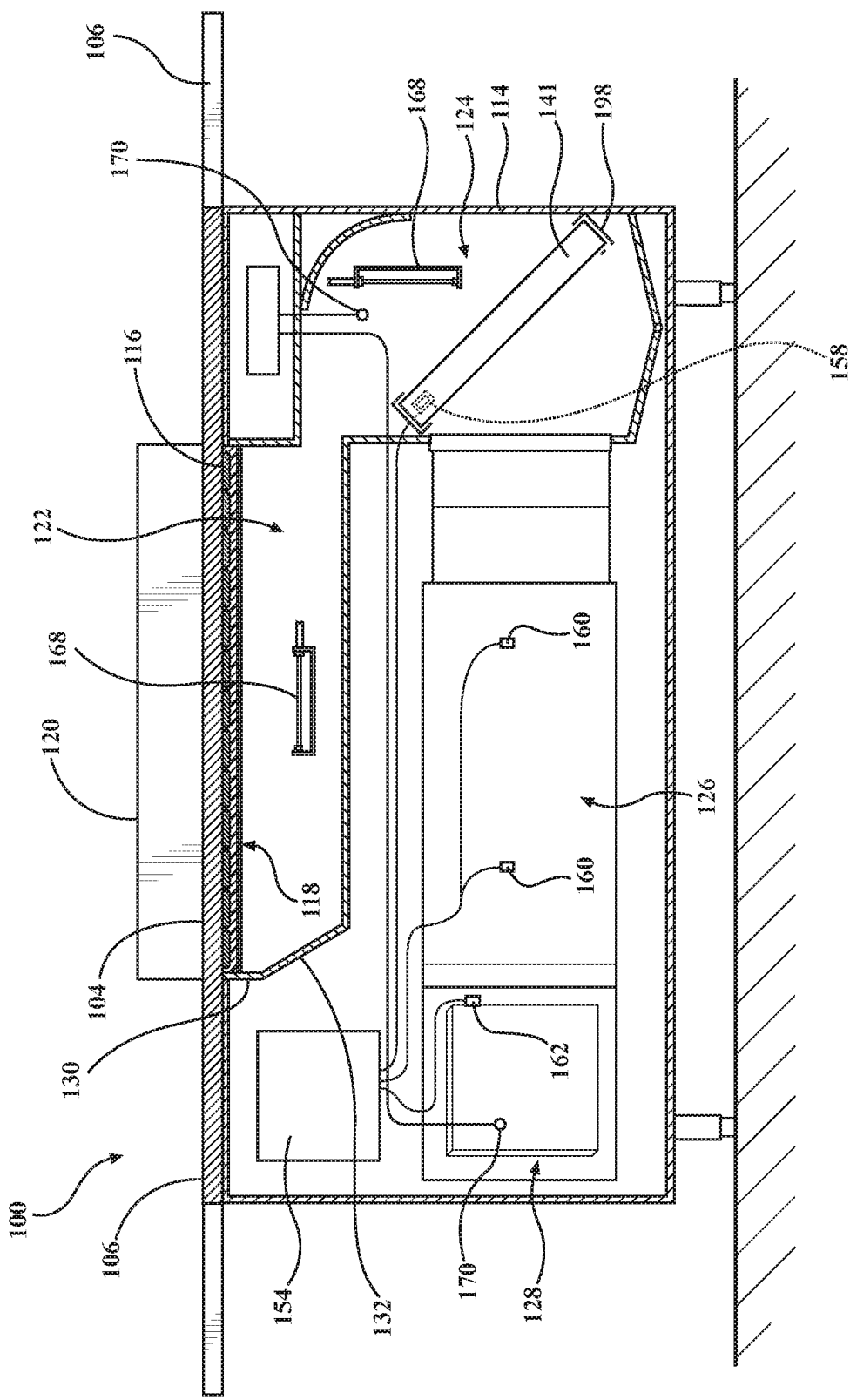
FIG. 6 is a cross-sectional view of the embodiment of the tabletop cooking assembly shown in FIG. 4 from a food preparation side.

Referring to FIG. 5, a cross sectional view of the assembly 100 in FIG. 4 is shown from the customer side. FIG. 6 is a cross sectional view of the assembly 100 in FIG. 4 shown from the food preparation side. It is to be appreciated that the subjection may be have either a right or left hand configuration and is shown in only one configuration in the Figures. The assembly 100 comprises a table frame 114 supporting the cooking element 102. The cooking element 102 has a heating surface 116 on an underside and a heating system 118 is disposed under the cooking element 102 for heating the cooking area 104. A vent hood 120 is disposed adjacent to the vent 110 for collecting the smoke.

The assembly 100 generally includes a first exhaust duct 122, a filter assembly 124, an electrostatic precipitator 126, and a high velocity blower 128. The high velocity blower 128 is in fluid communication with the first exhaust duct 122 and the filter assembly 124 for drawing smoke from the cooking element 102 through the vent 110. The first exhaust duct 122 comprises an upper plenum 130 and a lower plenum 132 being substantially perpendicular to the upper plenum 130 as shown in FIGS. 7 and 8. The first exhaust duct 122 is substantially unobstructed and in fluid communication with the vent 110 for directing smoke away from the cooking element 102. The first exhaust duct 122 is substantially free of obstructions such that the flow of air into the first exhaust duct 122 is not diverted, blocked, or restricted by other ducts or similar structure. It is to be appreciated that typical fire suppression equipment or sensors may be placed within the first exhaust duct 122 without substantially obstructing the air flow.

Various configurations of the upper and lower plenum 132 may be utilized with the subject invention, so long as the first exhaust duct 122 remains substantially unobstructed. FIG. 7 illustrates one embodiment of the upper plenum 130 having one side 134 extending diagonally from the vent 110 and another side 136 extending orthogonally from the vent 110 and orthogonally intersecting the lower plenum 132. FIG. 8 illustrates another embodiment having at least one side 138 extending orthogonally from the vent 110 and at least one side 140 extending diagonally from the lower plenum 132. The lower plenum 132 is shown as being substantially triangularly shaped to direct airflow into the filter assembly 124. It is to be appreciated that other shapes may be used without deviating form the subject invention. The lower plenum 132 has a substantially rectangular opening engaging the filter assembly 124.

The filter assembly 124 is in fluid communication with the lower plenum 132 and includes a filter 141 disposed within the filter assembly 124 for filtering the smoke as the smoke passes therethrough. The filter 141 is supported by a filter bracket 198 that has a plurality of perforations to allow the passage of grease from the filter 141, through the bracket 198 and into the drawers 108. The filter 141 is typically a metal filter as is known to those of ordinary skill in the art, such as a grease filter. The filter 141 is removable from the filter assembly 124 for allowing cleaning or replacement. The filter assembly 124 also includes a slanted bottom with a plurality of holes therein for allowing any grease to pass therethrough and into the drawers 108.

Referring back to FIG. 5, the vent hood 120 includes a cover 142 having plurality of slots 144 extending vertically along the length of the vent hood 120. It has been discovered that in combination with the subject invention, to ensure complete capture of the smoke, the orientation of the slots 144 in the cover 142 impacts the collection of the smoke. It is preferable that the slots 144 have a height at least 50% of a height of the vent hood 120 and extend the length of the cooking area 104. Typically, the slots 144 may range from 2-4 inches in height. The embodiment shown in FIG. 5 illustrates the vent hood 120 and the slots 144 having the same length as the length of the cooking area 104 and the slots 144 extend vertically.

It is to be appreciated that the cooking area 104 may have a cooking area length (A) less than a cooking element length (B) as best shown in FIG. 4. In other words, the cooking area 104 is less than the area of the cooking element 102. While it is expected that some heat will transfer through the entire cooking element 102, the cooking area 104 is referred to as the area that receives direct heat as will be discussed in more detail below. Preferably, the vent 110 has a vent length (C) that extends at least the cooking area length (A) to ensure capture of the smoke. FIG. 3 illustrates the vent hood length (D) and the vent length (C) being the same as the cooking area length (A). The vent hood length (D) may be longer than the cooking area length (A). It is to be appreciated that the length of the vent 110 may extend further than the length of the cooking area 104 depending upon the potential uses of and the types of food prepared on the cooking assembly 100.

Figure 9:
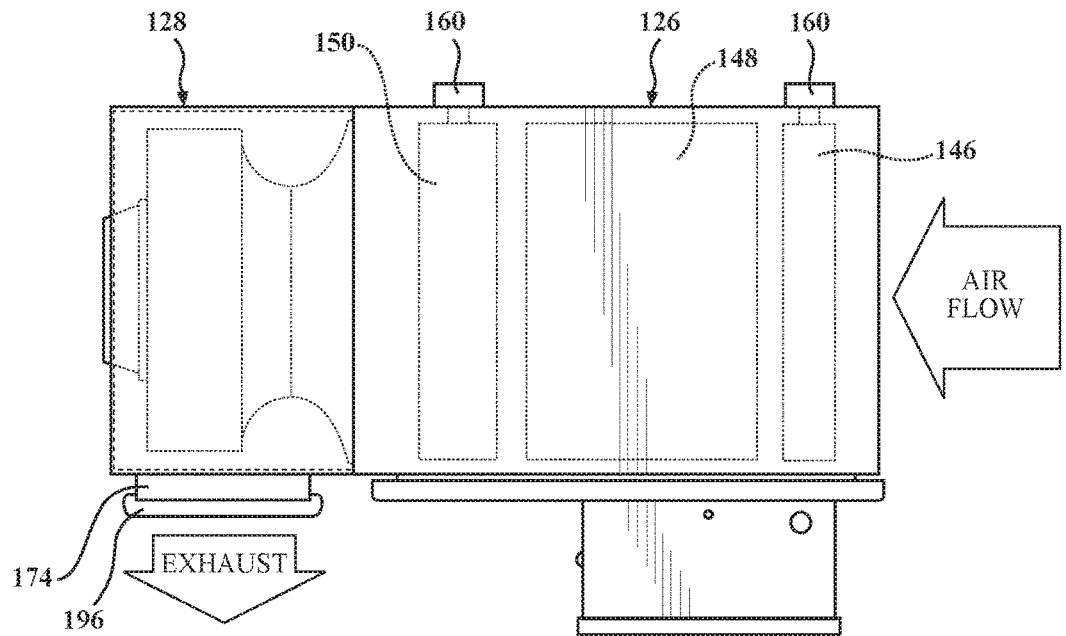
FIG. 9 is a top-view of one embodiment of a high velocity blower and an electrostatic precipitator according to the subject invention.

FIG. 9 is a cross-sectional view of one embodiment of the high velocity blower 128 and the electrostatic precipitator 126. The high velocity blower 128 draws smoke from the cooking element 102 through the vent 110 at a velocity greater than 750 feet per minute to substantially cool the smoke for improving removal of particles from the smoke as a result of the first exhaust duct 122 being substantially unobstructed. Preferably, the high velocity blower 128 draws smoke through the vent 110 at a velocity of greater than 1,250 feet per minute. The high velocity blower 128 preferably has a blower capacity of greater than 1,500 cubic feet per minute and a discharge efficiency as measured by the air collected through the vent 110 of at least 50% and more preferably 75%. Most preferably, the high velocity blower 128 is a backward curved, centrifugal blower 128 with an external rotor motor with a blower capacity of at least 2,000 cubic feet per minute. It is to be appreciated that different types of high velocity blowers may be utilized to achieve the characteristics of the subject invention while still practicing the subject invention. The high velocity blower 128 exhausts the air through an exhaust opening 174 on the food preparation side.

The combination of the substantially unobstructed first exhaust vent 110 and the high velocity blower 128 collects the smoke from the cooking area 104 at a rate that cools the smoke to a temperature of no more than 10 degrees above room temperature. Preferably, no more than 7 degrees of above room temperature can be obtained with the subject invention. For example, if the room temperature is 68° F., then the high velocity blower 128 exhausts the smoke at 78° F. or less. The subject invention provides smoke collection at such a velocity to sufficiently cool the smoke and to begin the condensation of particles on the filter assembly 124 thereby improving the efficiency of the cooking assembly 100 and the cleanliness of the exhausted smoke. Because of these advantages, the subject invention can then be used in closed environments without the need for fresh air make-up and the need for outside exhausts.

Figure 10:
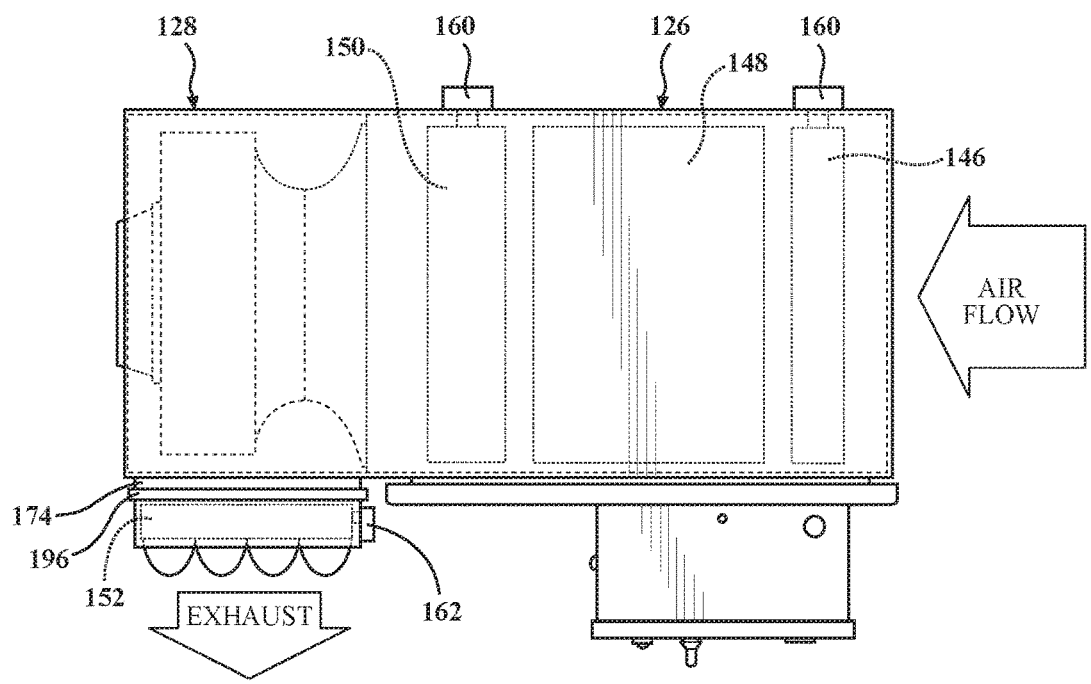
FIG. 10 is a top-view of another embodiment of a high velocity blower and an electrostatic precipitator according to the subject invention.
Figure 11:
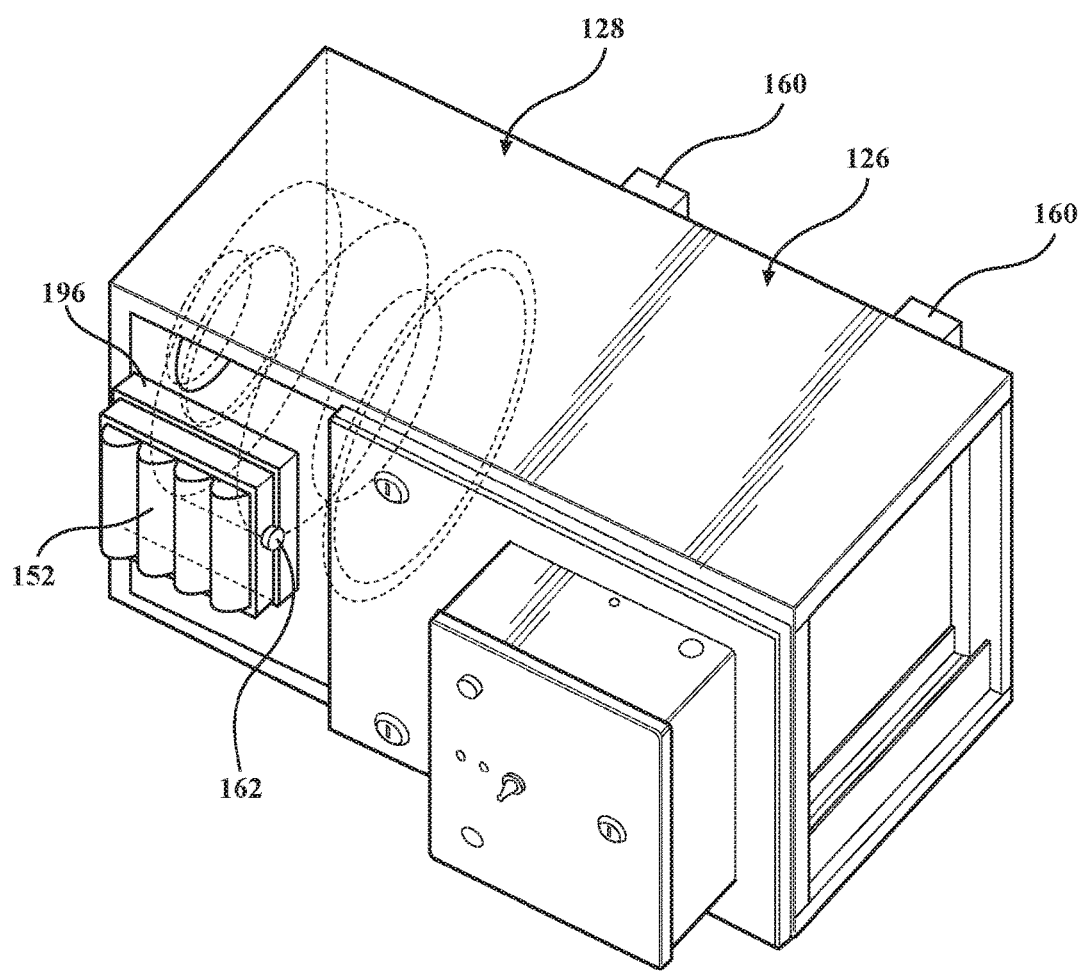
FIG. 11 is a front perspective view of the high velocity blower and the electrostatic precipitator shown in FIG. 10.
Figure 12:
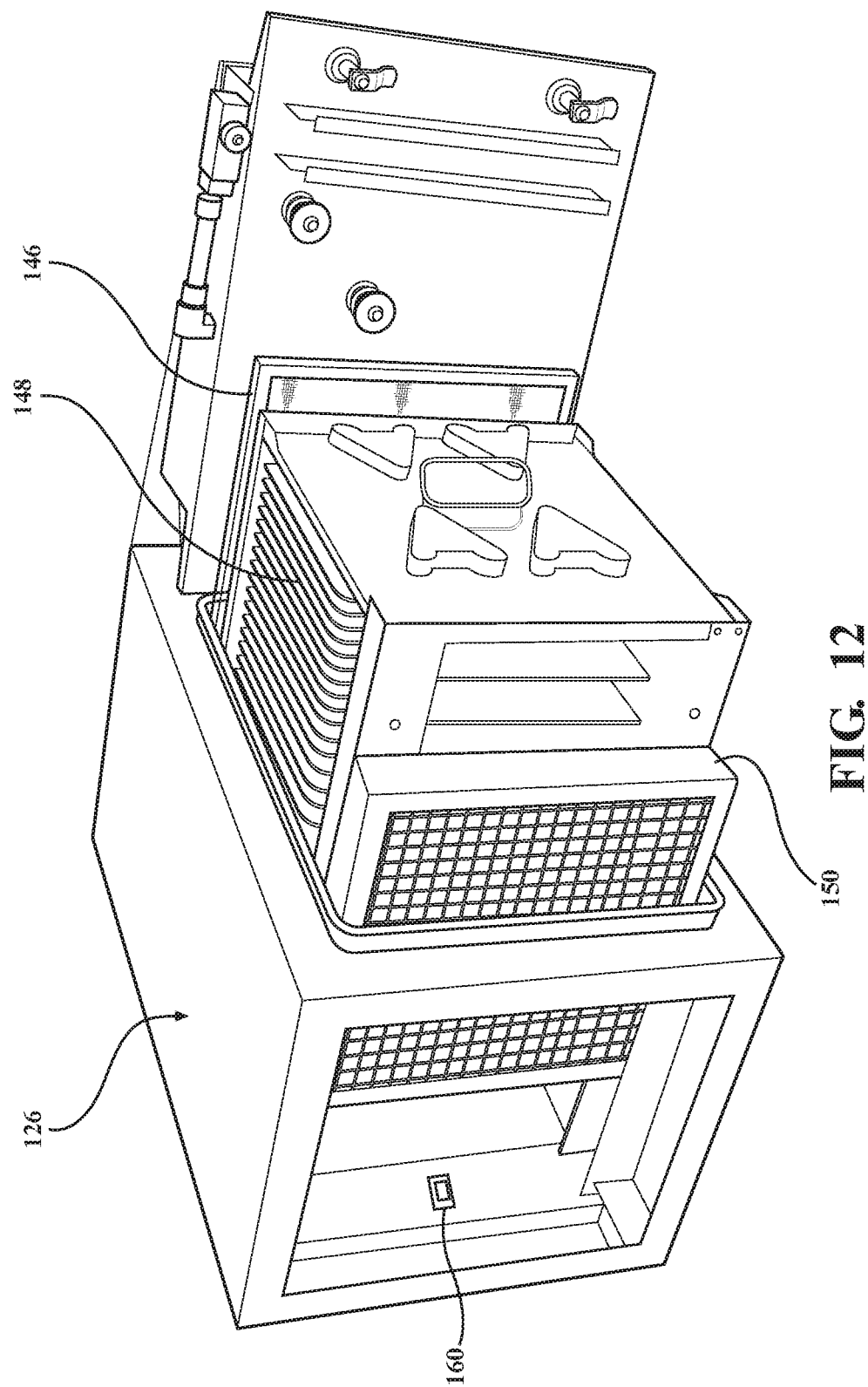
FIG. 12 is a perspective view of the electrostatic precipitator.

In addition to condensing and capturing the particles on the filter assembly 124, the electrostatic precipitator 126 further removes particles. The electrostatic precipitator 126 is in fluid communication with and directly connected to the high velocity blower 128. By directly connecting the high velocity blower 128 to the electrostatic precipitator 126, the subject invention improves the efficiency of the smoke collection which is one drawback of the related art. Most preferably, the electrostatic precipitator 126 and the high velocity blower 128 are unitary for improving air flow efficiency drawn from the cooking element 102 as shown in FIGS. 10 and 11. In other words, the blower 128 and the electrostatic precipitator 126 share one continuous housing, thereby improving air flow efficiency. The electrostatic precipitator 126 typically includes at least one of a pre-filter 146, a static collection cell 148, and a media filter 150 as shown in FIG. 12 is to be appreciated that the electrostatic precipitator 126 may have more or fewer filters or cells depending upon the application.

Figure 13:
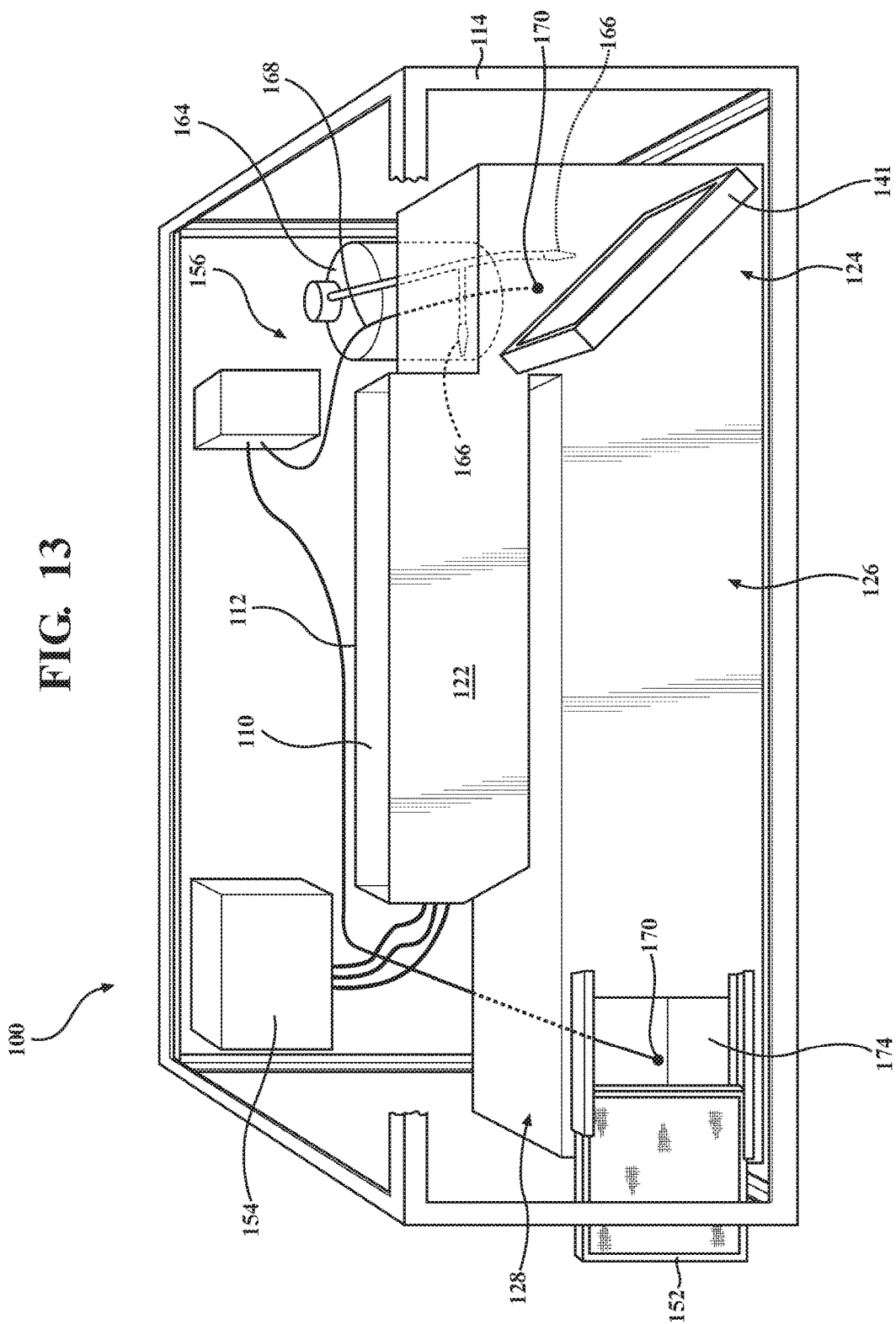
FIG. 13 is a fragmented front perspective view of a tabletop cooking assembly according to the subject invention.

The subject invention may also include a muffler 152 mounted downstream of the high velocity blower 128 on the exhaust opening 174, as shown in FIGS. 10 and 11. The muffler 152 helps reduce noise of the subject invention. It is preferable that the muffler 152 also include odor absorbing media for further cleaning of the smoke. This provides yet another mechanism for removing particles from the smoke and ensuring that the discharge air meets local air quality standards. Typically, for air to be exhausted into a closed environment without the requirement for fresh make-up air, there needs to be less than 10 ppm of grease in the smoke. The subject invention achieves these requirements. More specifically, the subject invention provides exhaust with less than 5 ppm of grease in the smoke. The embodiment in FIGS. 10 and 11 shows the muffler 152 mounted to the exhaust opening 174. FIG. 13 shows the muffler 152 being removeable from the high velocity blower 128 housing. The subject invention may also include a fire damper 196 at the exhaust opening 174. The fire damper 196 may be in front or behind the muffler 152, if present. If a fire were to occur within the assembly 100, the fire damper 196 would close the exhaust opening 174 to contain the fire within the assembly 100.

As discussed above in connection with the related art assemblies, it is important that the cooking tables are safe for use within cooking establishments and the drawback has been that related art configurations have led to safety problems. The subject invention overcomes these problems by utilizing a safety system that includes a plurality of switches and sensors that are monitored by a controller 154 and a fire suppression system 156. Specifically, the safety system of the subject invention includes a filter switch 158, ESP switches 160, and a muffler switch 162, if present. The filter switch 158 detects the presence of the filter 141, which is shown in FIG. 6. The ESP switches 160 detect at least the presence of the pre-filter 146 and the media filter 150. The muffler switch 162 detects the presence of the muffler 152. The controller 154 monitors the ESP switches 160, the muffler switch 162, and the filter switch 158 and will not energize the heating element unless the same are closed.

Figure 14:
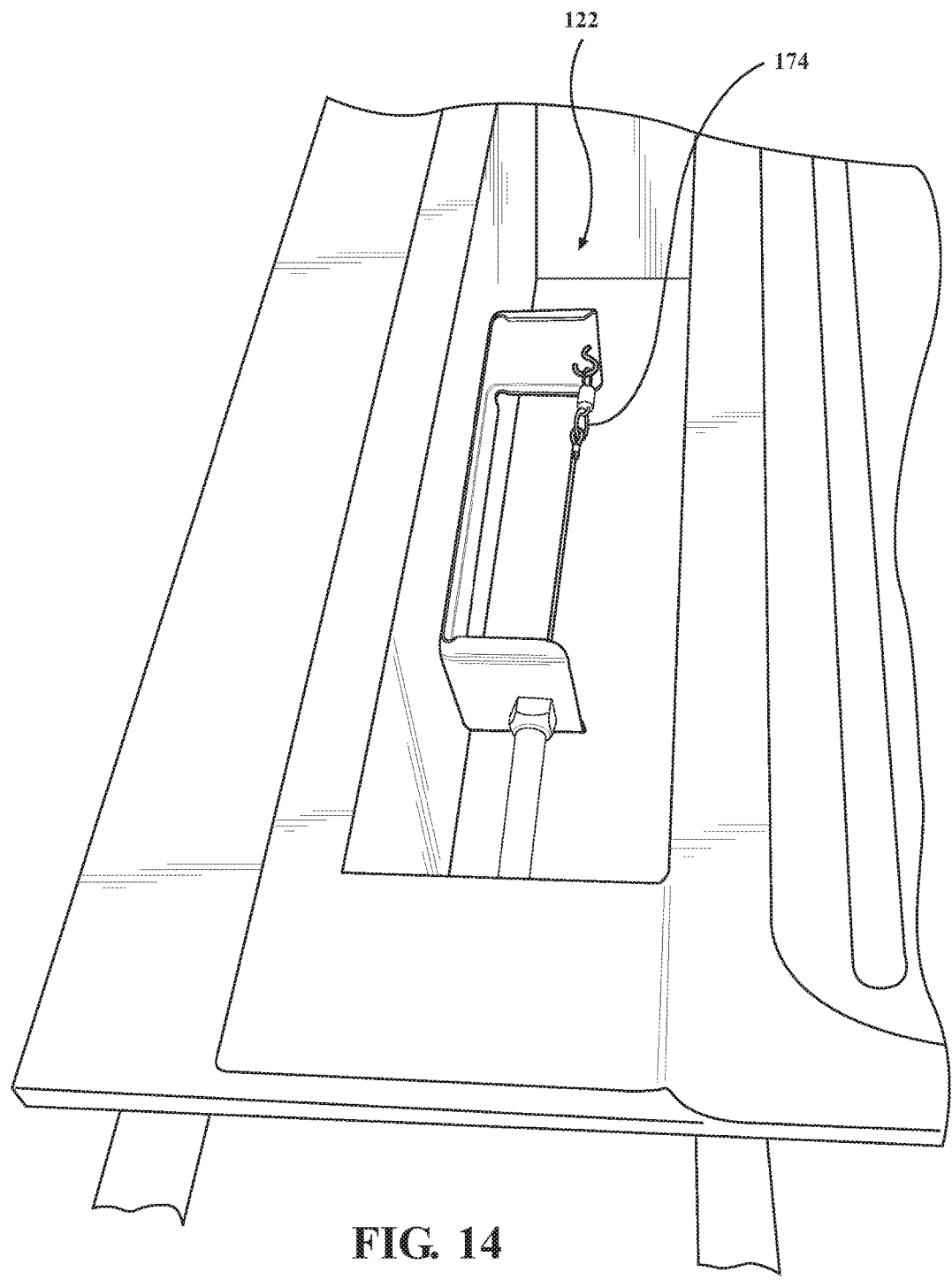
FIG. 14 is a perspective view of a temperature sensor used with the subject invention.

The fire suppression system 156 is best shown in FIG. 13 and includes a tank of fire retardant 164 that is directed and dispensed into the first exhaust duct 122 and the filter assembly 124 through nozzles 166. FIG. 14 is a close-up perspective view of a temperature sensor 168 located within the first exhaust duct 122 and the filter assembly 124. Preferably, the temperature sensor 168 is a frangible metal temperature sensor 168. If a fire occurs in either unit, the temperature sensor 168 breaks when the temperature exceeds a predetermined limit and the fire retardant 164 is dispensed into the cooking assembly 100. It is to be appreciated that additional fire nozzles may be located in other areas of the cooking assembly 100 for increased safety.

The cooking assembly 100 of the subject invention may also include pressure sensors 170, such as a pressure tube, that are placed within the exhaust duct 122 to ensure that proper air flow is maintained, as shown in FIGS. 5 and 6. If the pressure drops within the exhaust duct 122, power is turned off to the heating system 118. More specifically, if there is a loss of 25% or more of the airflow, such as due to dirty filters, blocked ducts, inefficiencies, or the like, the heating mechanism is shut down. After starting, if air flow is occurring through the duct, the heating system 118 is activated after being switched on. If there is no air flow, then the heating system 118 will not be activated.

Figure 1:
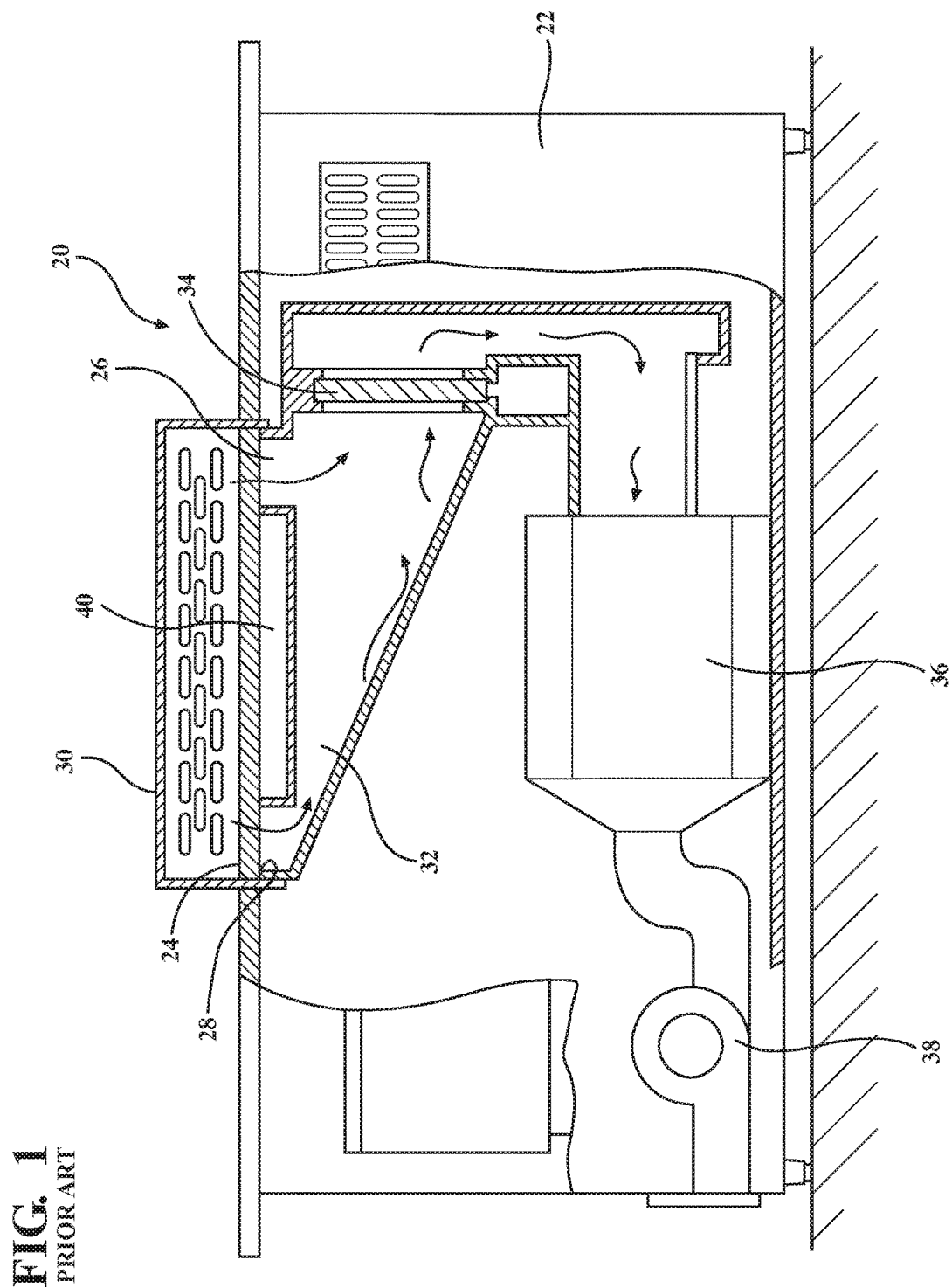
FIG. 1 is a cross-sectional view of a related art cooking assembly.
Figure 15:
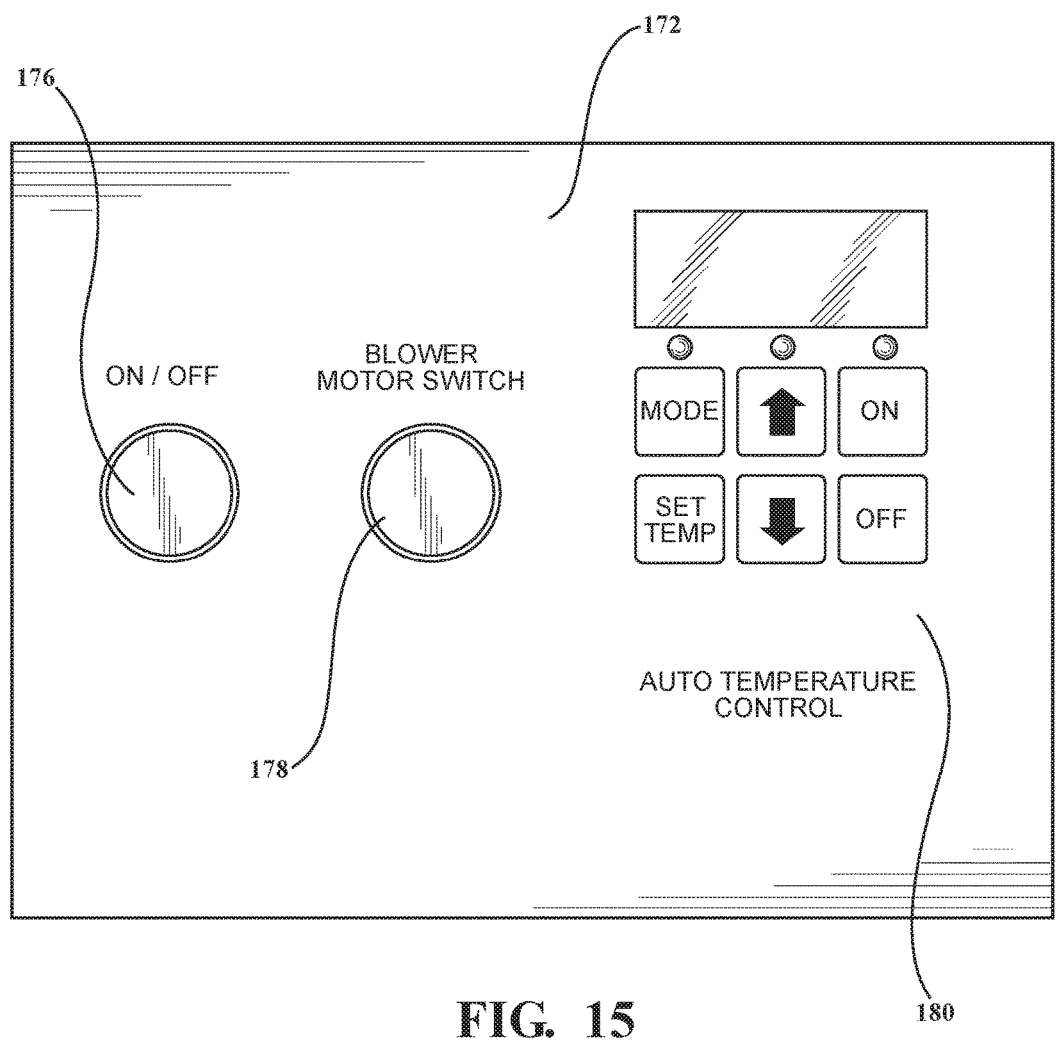
FIG. 15 is a front-view of a control panel according to the subject invention.

FIG. 15 shows one embodiment of a control panel 172 for the subject invention. The control panel 172 is used to control the cooking assembly 100 and typically includes an on/off switch 176, a blower motor switch 178, and a temperature setting control 180. As discussed above in connection with related art, it was common for the control panels to be positioned directly inline with the exhaust ducts and even have the exhaust ducts surrounding the control panel, as shown in FIG. 1. The location of the control panel in these related art assemblies reduced and restricted the air flow through the exhaust ducts such that smoke would escape from the table surface into the surrounding areas. Further, if a fire were to develop in the exhaust duct, the temperatures would become so high that the control panel would overheat, burn, and melt the wiring that connected the control panel to other safety mechanisms. The subject invention has configured the exhaust duct 122 to allow the control panel 172 to be placed spaced from the exhaust duct 122, thereby eliminating these problems. Further, the subject invention ensures complete, or substantially complete, capture of the smoke from the table because of the increased air flow or air suction by making sure the exhaust duct 122 is not interrupted or diverted. Another aspect of the subject invention is that the assembly 100 is able to contain any fire that occurs on the cooking surface. In other words, any smoke generated due to a fire on the cooking surface will be captured into the exhaust duct 122 and the fire itself can be contained within the exhaust duct 122. These advantages are obtained due to the increased and improved air flow through the assembly 100.

Figure 16:
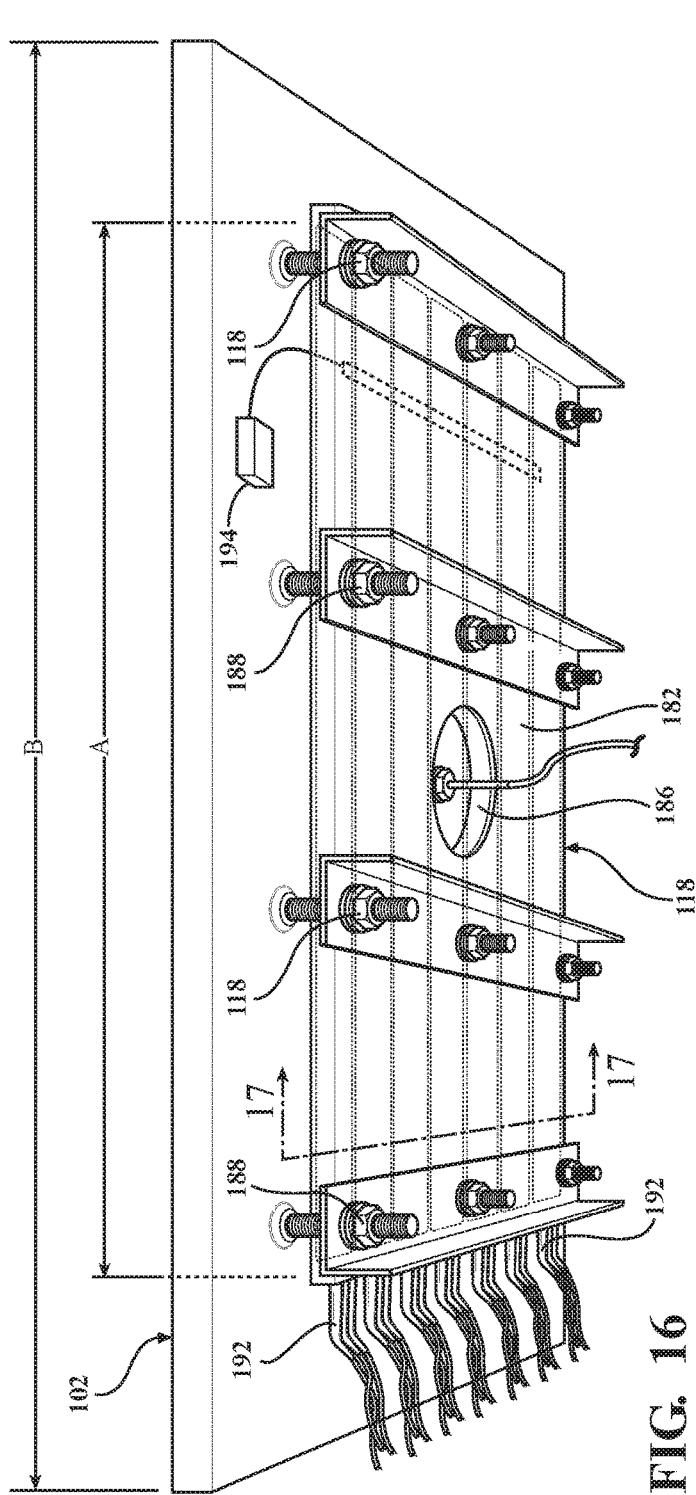
FIG. 16 is a perspective view of a heating system formed according to the subject invention.
Figure 17:
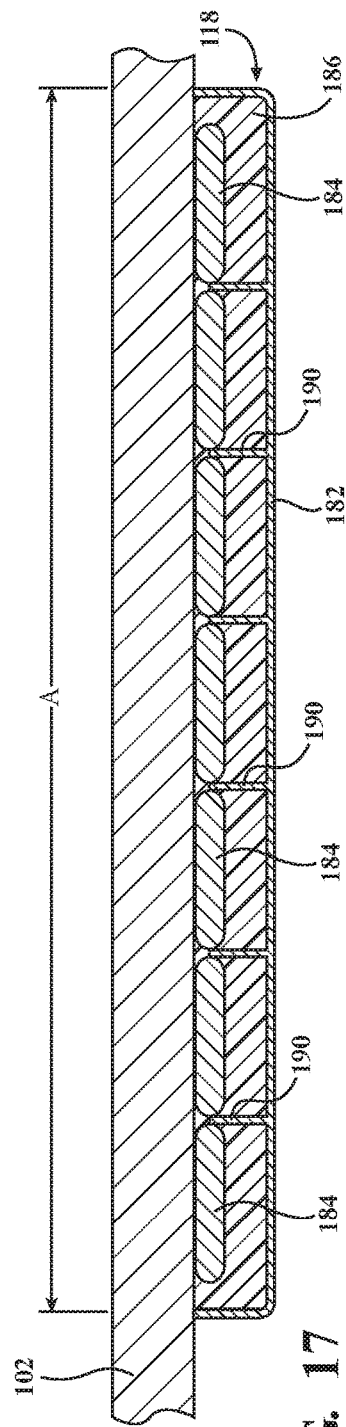
FIG. 17 is a cross-sectional view of a heating system formed according to the subject invention.

Referring now to FIGS. 16 and 17, a heating system 118 is shown coupled to the heating surface 116 of the cooking area 104. Preferably, the heating surface 116 is substantially planar and is free of grooves. The heating system 118 includes a retaining plate 182, a plurality of healing strips 184, and an insulating material 186. The heating strips 184 are disposed between the retaining plate 182 and the heating surface 116 to heat the cooking area 104 for preparing foods thereon. Each of the heating strips 184 is separately energized to produce heat to the heating system 118, which allows for better temperature control of the cooking area 104. The insulating material 186 is disposed between the retaining plate 182 and the heating strips 184 for directing heat from the strips towards the heating surface 116. Further, the insulating material 186 allows for any wiring to be a standard wire instead of high temperature wire because the heat is driving into the heating surface 116, The insulating material 186 is preferably a fire-rated, board insulation.

A release mechanism 188 releasably secures the heating system 118 into engagement with the heating surface 116 and allows the heating system 118 to be loosened from the heating surface 116 without being completely removed therefrom. The release mechanism 188 is preferably a plurality of fasteners, such as bolts or the like, that engage the retaining plate 182.

Since the heating strips 184 are individually removable from the heating system 118, heating strip guides 190 are utilized for guiding the heating strips 184 during removal and replacement from the heating system 118. The heating strip guides 190 may be located on the retaining plate 182, the insulating material 186, or the heating surface 116. The heating strip guides 190 space the heating elements from one another. During operation, if any of the heating strips 184 require replacement, the fasteners can be loosened, the connections to the heating strip 178 would be disconnected, and then the heating strip 178 can be removed individually from the heating system 118 by sliding out the heating strip 178 therefrom. A new heating strip 178 can be slid into place and the heating strip guides 190 ensure that the adjacent heating strips 184 do not contact one another. The fasteners are tightened and the retaining plate 182 and the insulating material 186 are then secured. The replacement of the heating strip 178 is accomplished without having to disassemble the assembly 100 or the heating system 118.

One advantage of the subject invention is that each of the plurality of heating strips 184 are separately removable from one another from the heating system 118 for allowing efficient replacement thereof. Preferably, the heating strips 184 have a generally rectangular cross-section for increasing transfer of heat into the heating surface 116 and the cooking area 104. Most preferably, the heating elements are three phase heating elements, however, other phase heating elements may be used, such as single phase. Referring to FIG. 16, the heating strips 184 include connection members 192 at each end to connect to a power supply (not shown). The connection members 192 extend from the heating system 118 and are not overly hot to the touch, such that accidents are avoided.

In addition to the safety features discussed above, yet another safety feature is that the heating system 118 includes a temperature probe 188 extending through the plate for monitoring a temperature of the heating system 118 and a temperature high limit switch 194 mounted to the heating surface 116 for monitoring the temperature of the cooking assembly 100. The controller 154 monitors the temperature high limit switch 194 and deactivates the heating element in response to the temperature high limit switch 194 being switched.

Many modifications and variations of the present invention are possible in light of the above teachings. The invention may be practiced otherwise than as specifically described within the scope of the appended claims. Therefore, it is an object of the appended claims to cover all such modifications and variations that come within the true spirit and scope of this invention.

What is claimed is:
1. A tabletop cooking assembly, comprising:
a table frame;
a cooking element supported by said table frame;
a vent disposed peripherally to a side of said cooking element and defining an aperture for receiving smoke generated during preparation of food on said cooking element;
an exhaust duct, said exhaust duct being substantially unobstructed and in fluid communication with said vent for directing smoke away from said cooking element;

a filter assembly in fluid communication with said exhaust duct and comprising a filter disposed therein for filtering the smoke as the smoke passes through said filter assembly; and a high velocity blower in fluid communication with said exhaust duct and said filter assembly for drawing smoke from said cooking element through said vent at a velocity greater than 750 feet per minute to substantially cool the smoke for improving removal of particles from the smoke.

2. The tabletop cooking assembly as set forth in claim 1, wherein said high velocity blower is further defined as drawing smoke through said vent at a velocity of greater than 1250 feet per minute.

3. The tabletop cooking assembly as set forth in claim 1, further comprising a control panel laterally offset from said exhaust duct.

4. The tabletop cooking assembly as set forth in claim 1, wherein said vent has a length extending at least a length of a cooking area of said cooking element.

5. The tabletop cooking assembly as set forth in claim 1, further comprising a precipitator in fluid communication with said high velocity blower.

6. The tabletop cooking assembly as set forth in claim 5, wherein said precipitator comprises at least one of a pre-filter, a static collection cell, and a media filter.

7. The tabletop cooking assembly as set forth in claim 1, further comprising a muffler positioned downstream of said high velocity blower.

8. The tabletop cooking assembly as set forth in claim 1, wherein said tabletop cooking assembly is configured to substantially cool the smoke to a temperature of no more than 7 degrees above room temperature.

9. The tabletop cooking assembly as set forth in claim 1, wherein said exhaust duct comprises a substantially triangular plenum.

10. The tabletop cooking assembly as set forth in claim 1, further comprising a vent hood disposed adjacent to said vent.

11. The tabletop cooking assembly as set forth in claim 10, wherein said vent hood further comprises a cover having a plurality of slots extending vertically along said length of said cover.

12. The tabletop cooking assembly as set forth in claim 1, wherein said high velocity blower has a discharge efficiency through said vent of at least 75% of a blower capacity of said high velocity blower.

13. The tabletop cooking assembly as set forth in claim 1, wherein said exhaust duct comprises an inlet and an outlet, said inlet being in fluid communication with said vent and said outlet being in fluid communication with said filter assembly.

14. A tabletop cooking assembly, comprising:
a table frame;
a cooking element supported by said table frame;
a vent disposed peripherally to a side of said cooking element and defining an aperture for receiving smoke generated during preparation of food on said cooking element;
an exhaust duct, said exhaust duct being substantially unobstructed and in fluid communication with said vent for directing smoke away from said cooking element;
a filter in fluid communication with said exhaust duct for filtering the smoke as the smoke passes through said filter;
a precipitator in fluid communication with said filter; and
a high velocity blower in fluid communication with said exhaust duct and said precipitator for drawing smoke from said cooking element through said vent at a velocity greater than 750 feet per minute for improving removal of particles from the smoke.

15. The tabletop cooking assembly of claim 14, further comprising a control panel laterally offset from the exhaust duct.

16. The tabletop cooking assembly of claim 14, further comprising a vent hood disposed adjacent to said vent.

17. The tabletop cooking assembly of claim 14, wherein said tabletop cooking assembly is configured to cool the smoke to a temperature of less than 10 degrees above room temperature.

18. A tabletop cooking assembly, comprising:
a table frame;
a cooking element supported by said table frame;
a vent disposed peripherally to a side of said cooking element and defining an aperture for receiving smoke generated during preparation of food on said cooking element;
a vent hood disposed adjacent to said vent;
an exhaust duct, said exhaust duct being substantially unobstructed and in fluid communication with said vent for directing smoke away from said cooking element;
a filter assembly in fluid communication with said exhaust duct and comprising a filter disposed therein for filtering the smoke as the smoke passes through said filter assembly;
a high velocity blower in fluid communication with said exhaust duct and said filter assembly for drawing smoke from said cooking element through said vent at a velocity greater than 750 feet per minute to substantially cool the smoke; and
a muffler mounted downstream of said high velocity blower.

19. The tabletop cooking assembly as set forth in claim 18, further comprising a control panel laterally offset from said vent.

20. The tabletop cooking assembly as set forth in claim 18, further comprising a precipitator in fluid communication with said high velocity blower.

* * * * *